United States Patent [19]
Conde

[11] 3,820,506
[45] June 28, 1974

[54] PULSATOR FOR MILKING MACHINES
[75] Inventor: Lyall T. Conde, Sherrill, N.Y.
[73] Assignee: Conde Milking Machine Co., Inc., Sherrill, N.Y.
[22] Filed: May 29, 1973
[21] Appl. No.: 364,249

[52] U.S. Cl. ......... 119/14.01, 119/14.28, 119/14.41, 137/550
[51] Int. Cl. ............................................. A01j 5/14
[58] Field of Search............. 119/14.01, 14.39, 14.4, 119/14.41, 14.3, 14.33, 14.37, 14.38; 137/550

[56] References Cited
UNITED STATES PATENTS

| | | | |
|---|---|---|---|
| 3,070,067 | 12/1962 | Fjermestad | 119/14.01 X |
| 3,172,391 | 3/1965 | Norton | 119/14.01 X |
| 3,183,920 | 5/1965 | Cochran | 119/14.41 X |
| 3,480,038 | 11/1969 | Simons | 119/14.41 X |

FOREIGN PATENTS OR APPLICATIONS

| | | | |
|---|---|---|---|
| 128,935 | 8/1950 | Sweden | 119/14.01 |

*Primary Examiner*—James H. Czerwonky
*Attorney, Agent, or Firm*—Bruns & Jenney

[57] ABSTRACT

A stall cock has a rubber ball check valve in the passage connecting it to its vacuum line and an insulated contact electrically connected to one side of an electrical timer, the other side of the timer being connected to the vacuum line. The cooperating pulsator has a substantially cylindrical body manually graspable and with a radially projecting vacuum nipple for insertion in the stall cock and a spaced insulated contact finger adapted to hookedly engage the stall cock contact. An oppositely projecting control nipple leads from a central valve chamber and is adapted to be connected by flexible hose to the space between teat cup shell and inflation. The drum is secured to the plunger of a solenoid having its coil below the plunger and electrically connected at one end to the vacuum nipple and at the other end to the contact finger whereby the drum normally shuts off vacuum from the control nipple and connects vacuum to the control nipple when the solenoid is operated and the finger removably secures the pulsator to the stall cock.

3 Claims, 13 Drawing Figures

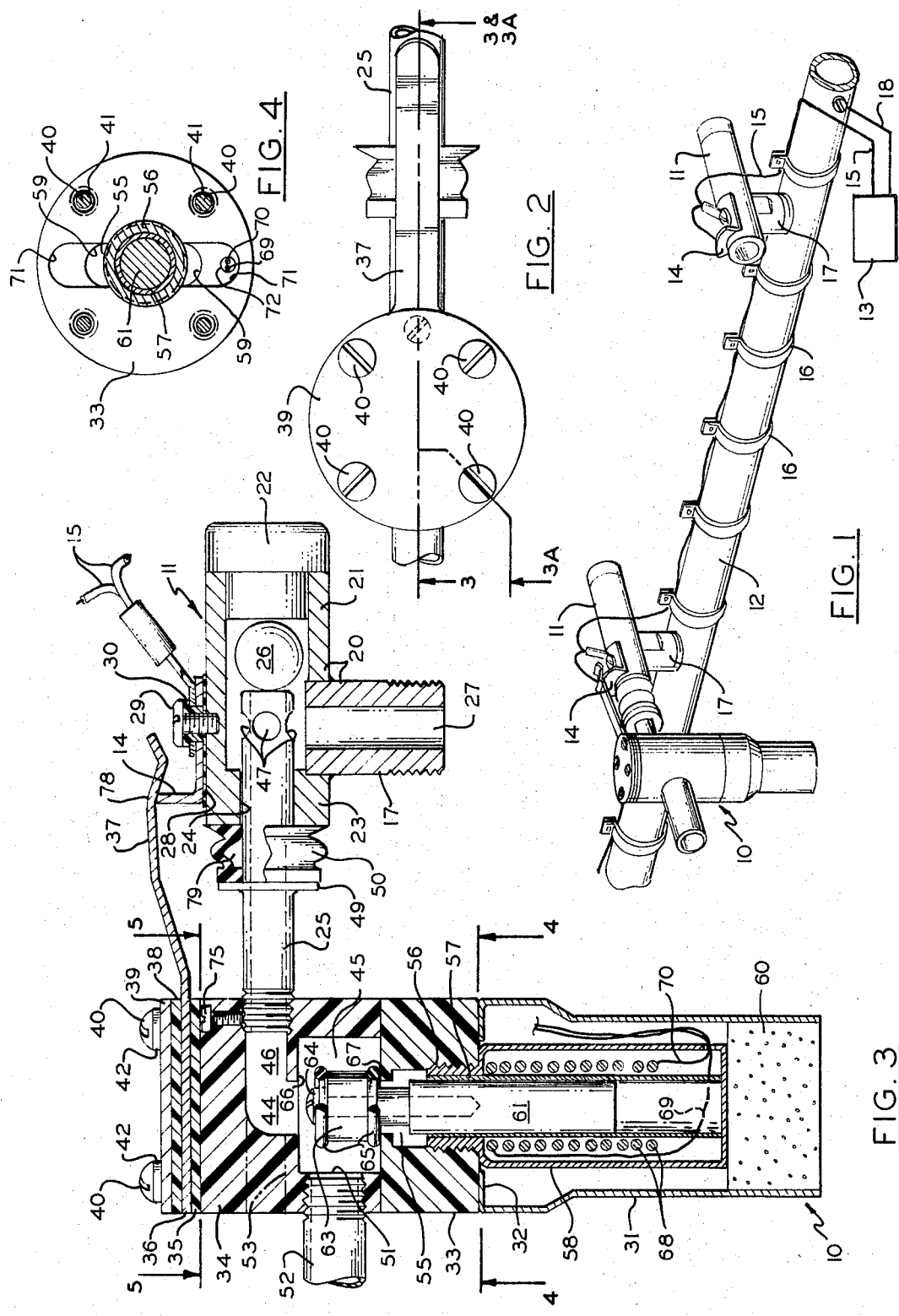

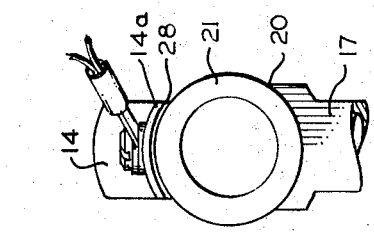
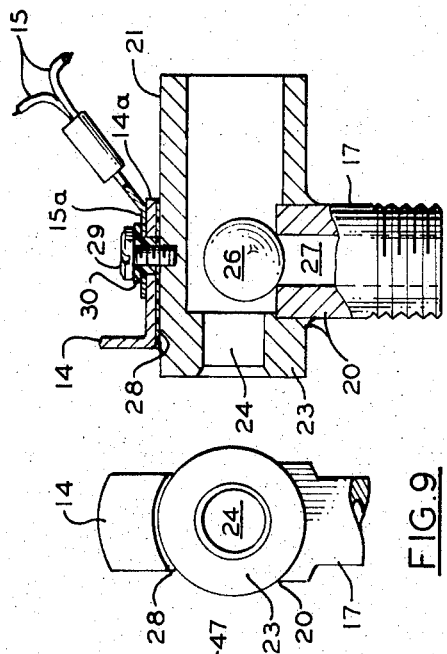
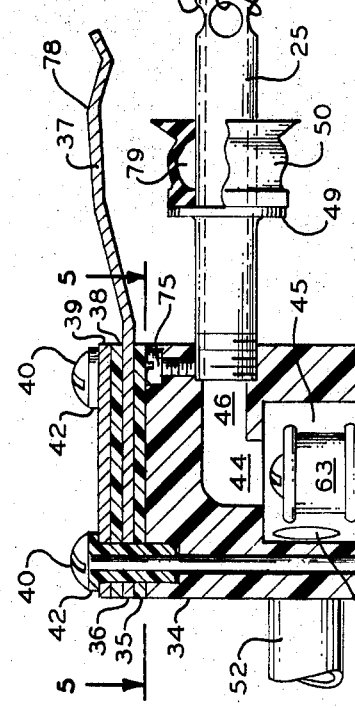
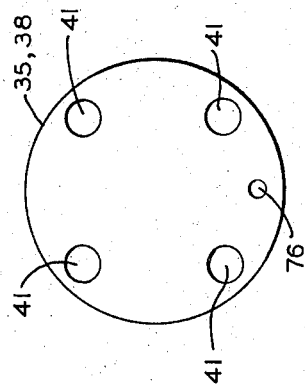
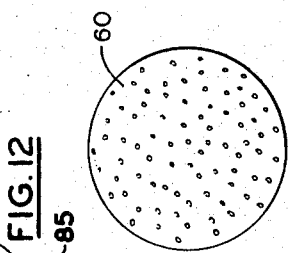
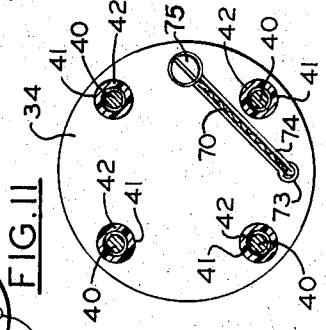
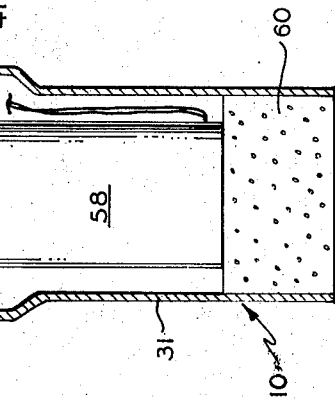

PULSATOR FOR MILKING MACHINES

BACKGROUND OF THE INVENTION

This invention relates to milking machines and more particularly to a novel combination of stall cock and pulsator for connection thereto.

Prior art milking machines have provided pulsators adapted to be moved from one stall cock to another but usually one hand is required to connect or disconnect the pulsator and stall cock and another hand is required to make the electrical connection or to turn the vacuum on or off.

Since the operator usually must also carry the remainder of the milking machine, it is the principal object of the present invention to provide a pulsator-stall cock combination which can be joined or separated with one hand quickly and conveniently.

Another object is to provide a pulsator which can be manufactured economically, having an improved solenoid operated valve and having an improved sealed connection with the stall cock with which it is used.

Still another object is to provide a pulsator for quickly moving large quantities of air from the teat cup shells for good inflation action.

SUMMARY OF THE INVENTION

This invention contemplates a pulsator which can be held in one hand, like a hand-gun, and having a vacuum nipple, like a gun barrel, which can be inserted in one of a plurality of stall cocks for connecting the vacuum in the pipe line to the pulsator, both stall cock and pulsator having electrical contacts which can be engaged by a simple rotation of the wrist or pressure on the pulsator. Removal of the pulsator is accomplished by reverse action in inverse order and the sealing of the stall cock to prevent air entering the vacuum line is automatic.

Each stall cock has a rubber ball moveable by suction to seal over the passage in a nipple leading to the vacuum line. The ball is displaceable by the vacuum nipple on the pulsator, the nipple end having a plurality of holes therethrough to provide for free passage of air when positioned against the ball valve.

The stall cock has an insulated electrical contact having a curved surface spaced radially of the entrance passage for the pulsator vacuum nipple and the pulsator has a contact finger spaced from the vacuum nipple whereby the finger engages the curved surface upon rotation of the pulsator after the vacuum nipple is received in the stall cock or the finger may be simply cammed over the stall cock contact by pushing. An annular rubber seal around the vacuum nipple has one face engaging an annular flange on the nipple and has another face adapted to engage the stall cock when the nipple is inserted, the wall of the seal being curved between the two faces to augment the flexibility of the seal.

A pulsator actuator has one terminal connected to the vacuum line and the other wired to all the stall cock contacts on the vacuum line. The pulsator has a solenoid whose coil is electrically connected in series between the vacuum nipple and the contact finger whereby pulses of electric current from the pulsator actuator rhythmically actuate the solenoid when the pulsator is engaged with the stall cock.

The pulsator has a valve chamber therein with passage to the vacuum nipple thereabove and a passage to atmosphere therebelow in which the solenoid is secured. A third passage leading from the valve chamber to a control nipple is adapted to be connected through the usual claw to the space between shell and inflation of all the teat cups of the milking machine. A novel valve carried on the solenoid plunger is in the form of a drum having an annular groove therearound at its top and bottom edges. Each groove carries an O-ring, the upper ring projecting above the top surface and the lower ring projecting below the bottom edge of the drum, whereby, when the drum is raised, the third passage is connected to atmosphere and, when the drum is lowered, the third passage is connected to vacuumm.

The passage to atmosphere terminates in a relatively large tubular opening and a cylindrical filter pad of resilient foamed plastic resin material is held in place frictionally so that it may be easily manually removed and replaced.

BRIEF DESCRIPTION OF THE DRAWINGS

FIG. 1 is a perspective view of a vacuum line in a milking area showing a plurality of stall cocks electrically connected to a pulsator actuator;

FIG. 2 is a plan view of a pulse gun according to the invention;

FIG. 3 is a side elevational view of the gun of FIG. 2 partly in section on the line 3—3 of FIG. 2, a stall cock engaged by the gun also being shown in partial section;

FIG. 3A, on sheet 2, is a view of the gun of FIG. 2 partly in section on the line 3A—3A of FIG. 2;

FIG. 4 is a sectional view on the line 4—4 of FIG. 3;

FIG. 5 is a sectional view on the line 5—5 of FIG. 3;

FIG. 6 is a plan view of the filter pad shown in FIGS. 3 and 3A;

FIG. 7 is a plan view of one of the insulating washers of FIG. 3;

FIG. 8 is an elevational view partly in section of the stall cock body and contact shown in FIG. 3;

FIGS. 9 and 10 are end views of the stall cock body of FIG. 8 as viewed from the left and right respectively;

FIG. 11 is a plan view on a reduced scale of the contact washer and finger shown in FIG. 2; and FIG. 12 is a diagrammatic side elevational view of a teat cup shell and inflation.

DESCRIPTION OF THE PREFERRED EMBODIMENT

A pulsator or pulse gun 10 is shown in FIG. 1 in engagement with one of a plurality of novel stall cocks 11 located in a vacuum pipe line 12 running through the milking stall or milking area of a barn. As is usual, the vacuum line is associated with a pulsation actuator device or timer 13 which may be of either the rotary or solid state kind which provides a regularly recurring pulse of 24 volts at a rate of about 56 times per minute, for example.

Each stall cock 11 has an electrical contact 14 and the contacts 14 are wired in series by a wire 15 extending from timer 13, the wire being supported on a plurality of plastic ties 16 on the pipe line 12 as shown in FIG.

1. Each stall cock 11 is grounded by a leg or nipple 17 by which it is connected to pipe line 12, the pipe being electrically connected by a wire 18 to the timer 13.

Referring now more particularly to FIGS. 3, 8, 9 and 10 the stall cock 11 has a body 20 which is a tee, one leg 17 of which is threaded for connection to the top of pipe line 12. Another leg 21 has an enlarged bore and is closed by a removable rubber plug 22 shown in FIG. 3. The third leg 23, having its bore 24 reduced in diameter, is adapted for the reception of the vacuum nipple 25 of the gun 10.

A valve, comprising a rubber ball 26, is contained in the bore of leg 21 and is adapted to be drawn to seat over the end of the bore 27 of leg 17 as shown in FIG. 8, when nipple 25 is withdrawn, for preventing air from entering vacuum line 12.

As seen in FIG. 9, the electrical contact 14 projects upwardly terminating in a convexly curved end. Contact 14 also has a horizontally disposed portion 14a curved to lie on top of the body 20 insulated therefrom by the pad 28 as best seen in FIG. 10.

Wire 15 has a connector portion 15a adapted to be secured in electrical contact with portion 14a by a screw 29, as shown in FIG. 8, the screw being electrically insulated by a sleeve 30, T-shaped in longitudinal section, from portions 14a and 15a.

Referring again to FIG. 3, the gun 10 has a substantially cylindrical hollow stainless steel grip portion 31 having an inturned annular flange 32 therearound at its top. Above grip 31 are two substantially cylindrical body portions of nylon, the body bottom 33 and the body top 34. The body portions each have a diameter substantially the same as the upper portion of the grip 31. Above body top 34 are, successively, a nylon insulating washer 35, a stainless steel washer 36 having an integral projecting narrow contact finger 37, as seen in FIG. 11, another nylon washer 38 like washer 35 and a stainless steel cover washer 39.

Securing these parts together are four elongated screws 40, located as indicated in FIG. 2. The screws extend down through appropriate holes, designated 41 in the various parts in FIGS. 4, 5, 7 and 11, and, shown at the left in FIG. 3A, are engaged in suitable threaded holes in the flange 32 of the grip. Insulating sleeves 42, T-shaped in longitudinal section, are provided for bolts 40 at their upper ends for insulating the bolts from washers 36 and 39.

The body top 34 is provided with a vacuum chamber 44 at its center and immediately and coaxially therebelow with a larger valve chamber 45 extending to the body bottom 33. Vacuum chamber 44 has a passage 46 extending laterally therefrom in which one end of nipple 25 is threadedly engaged. The other end of nipple 25 has four holes 47 extending therethrough adjacent its end for the free passage of air when the end of nipple 25 is engaged with the ball valve 26 of the stall cock.

Substantially midway between its ends nipple 25 is provided with an annular fixed flange 49 and a novel rubber washer 50 is provided around nipple 25 for forming a seal between flange 49 and stall cock 11 as shown in FIG. 3.

The valve chamber 45 is also provided with a passage 51 extending laterally in a direction opposite to passage 46 and in this passage 51 is threadedly engaged one end of a control nipple 52. It will be understood that the other end of nipple 52 is adapted to be connected by a flexible hose directly to that chamber portion of a milk claw which is connected to the space between shell and inflation of the teat cups.

When the gun 10 is used in a unit installation, as distinguished from a pipeline installation, a third passage 53 leading laterally from the vacuum chamber and indicated in phantom lines in FIG. 3 may be provided in which a third nipple is threadedly engaged for connection to the pail of the unit installation.

In the upper end of the body bottom an air passage 55, smaller in diameter at its top than valve chamber 45, extends axially down to the lower surface of the body bottom and the lower end of passage 55 is threaded on opposite sides at 56 as shown in FIGS. 3 and 4. The threaded neck 57 of a solenoid 58 is engaged in the threaded portions 56. As shown in FIG. 4, passage 55 is not round except at the very top but is enlarged at 59 on diametrically opposite sides so that air can flow from the interior of grip 31 to passage 55 when the top of passage 55 is open. Below solenoid 58, the open end of grip 31 has a cylindrical filter pad 60 of resilient foamed plastic resin material which is frictionally held in place.

The upper end of the solenoid plunger 61 carries an axially extending nylon neck 62 smaller than the plunger and made integral with the larger valve body or drum 63. A screw 64, best seen in FIG. 3, secures the drum and neck to the plunger.

The top and bottom edges of drum 63 are each provided with an annular groove carrying an O-ring 65, the groove being slightly less than semicircular in cross section so that the O-rings project above the top surface of the drum and below the drum's bottom edge. When drum 63 is raised the upper O-ring seats against the valve seat 66 and when drum 63 falls the lower O-ring seats against the lower seat 67.

The coil winding 68, diagrammatically shown in FIG. 3, is arranged to lower the plunger 61 when the coil is energized. The upper end of the drum 63 carrying its O-ring 65 is narrowly spaced from the seat 66 so that drum 63 and plunger 61 are carried upward by suction from chamber 44 when solenoid 58 is not energized and nipple 25 is connected to vacuum. The insulated lead wires 69 and 70 to the coil winding 68 are shown fragmentarily in FIG. 3 and they continue above the surface of the paper of the drawing through one of the enlargements 59 of the air passage, as shown in FIG. 4, up in one of a pair of diametrically opposite recesses 71 communicating with enlargements 59, formed in the lower portion of the body bottom 33.

Above one of the recesses 71 a hole 72 is provided extending up to the upper surface of the body bottom. The body top is provided with a hole 73 in registry with hole 72, as best seen in FIG. 5, and wires 69 and 70 are led up through recess 71 and holes 72 and 73. The upper surface of the body top has a groove 74 leading from hole 73 to a screw 75 which is recessed in the surface, threaded in the nylon body top and screwed down to make electrical contact with the nipple 25 as shown in FIG. 3. One of the lead wires, 70 for example, is led along groove 74 and has its end stripped of insulation and wrapped around screw 75.

The insulation washer 35 is provided with a hole 76 (FIG. 7) and contact washer 36 (FIG. 11) is provided with a hole 77, the holes 76 and 77 being adapted to be in registry with hole 73 in the body top. The other lead wire 69 is led up through holes 76 and 77, its end stripped of insulation and laid out flat on the washer 36 so that, when washer 38 is secured in place thereabove, the wire 69 is in good electrical contact with washer 36.

As shown in FIG. 3, the comparatively narrow contact finger 37 projects outward from washer 36 and somewhat upwardly to a point 78 where it is bent downwardly. When the gun 10 is grasped with thumb and forefinger around the body bottom and other fingers around the grip, it may be rotated toward the horizontal and nipple 25 inserted in the bore 24 of the stall cock where it displaces the ball valve 26 from over the passage 27. Washer 50 advances against the stall cock body 20 and when this contact is felt the gun 10 can be rotated to the vertical position, the curved top of contact 14 camming the finger 37 into firm engagement therewith. The contact finger 37 engages the stall cock contact 14 substantially at the point 78 and a portion of the end of finger 37, being bent downward, holds the gun 10 in place with washer 50 compressed. Referring to FIG. 3A, the washer 50 is formed with an internal annular groove 79 between its end faces which gives its annular side wall a curved configuration making for a spring-like resiliency for holding the washer 50 against the stall cock.

It will be noted that the extreme end of finger 37 is slanted upward so that it may cam the finger over contact 14 if the nipple 25 is pushed into the stall cock without rotating the pulsator.

Referring to FIG. 12, the connection of the milking system to a cow comprises four teat cups 80. Each teat cup comprises a rigid metal shell 81 and an inflation 82 of rubber or similar material. The inflation 82 is tubular at the top with its sidewall folded outwardly over shell 81 as shown. At its other end the inflation terminates with an integral hose 83 of smaller diameter than the inflation end. Hose 83 is the milk hose through which milk is drawn by suction.

Hose 83 extends through an axial hole at the end of shell 81 and is sealed at this hole with the shell. This leaves a space between inflation and shell and a nipple 84 communicates with this space, a flexible hose 85 being attached to the nipple. It will be understood that air at atmospheric pressure and suction are alternately connected through nipple 85 to give a massaging action to the inflation to accomplish the milking.

In operation, suction is communicated from line 12 through the stall cock to nipple 25 and chamber 44 drawing the valve drum 63 up against seat 66 (FIG. 3) until such time as solenoid 56 is energized. When a pulse of 24 volt current is delivered by the timer 13 a circuit is completed through wire 15, contact 14, finger 37 of washer 36, wire 69 through solenoid coil 68, wire 70, screw 75, nipple 25, stall cock 20, pipe line 12 and back through wire 18. With the energizing of coil 68, plunger 61 is drawn down and the lower O-ring 65 is sealed against the seat 67.

Passage 55 to atmosphere is thus closed off from chamber 45 and the chamber is now in communication with the vacuum line through passage 46 and the vacuum nipple 25. Control nipple 52 is in communication with the space between shell and inflation in the teat cups, so pressure in this space equals the subatmospheric pressure at the interior of the inflation and the inflation expands.

When the 24 volt pulse ceases, the suction in chamber 44 again draws drum 63 upward sealing it against seat 66 and opening communication between chamber 45 and passage 55 which is in communication with atmosphere. Control nipple 52 thus communicates atmospheric pressure to the space between shell and inflation collapsing the inflation for the massage portion of the cycle.

It will be noted that drum 63 and the attached plunger 61 comprise the single moving operating part of pulsator and the distance it travels is short. This makes for a quick action in operation and a simple construction. There is no other pulsating mechanism, the flexible hose leading from control nipple 52 directly to the milk claw and inflation shells.

It will be noted that the passages for vacuum from nipple 25 to nipple 52, including the two nipples, chamber 45, the passage through valve seat 66, chamber 44, and passage 46 are all substantially equal in size with passages 24 and 27 in the stall cock. Assuming that there is a pump of a capacity to quickly exhaust vacuum line 12, the free passage of air through the pulsator vacuum passages ensures that air can be rapidly exhausted from the hose connecting nipple 52 with the teat cup shells. This results in a rapid change in pressure in the shells from atmospheric to subatmospheric pressure for a precisely measured inflation action.

I claim:

1. In a milking system including a vacuum line, a plurality of metal stall cocks each having a passage adapted to receive a nipple for connection to vacuum in the line, teat cup shell and inflation means for connecting the system to a cow, a pulsator, and a pulsator activator adapted to generate recurrent electrical pulses between electrical contacts connected to the vacuum line and the stall cocks respectively, the improvement comprising: the pulsator having a body housing a valve chamber therein, a drum-shaped valve moveably mounted for up and down movement in the chamber, seal means mounted on the upper and lower surfaces of the valve, circular valve seats in the chamber wall respectively above and below the valve, a passage through the upper seat terminating in a vacuum nipple mounted on said pulsator and adapted to be received in a stall cock, a passage through the lower seat leading to atmosphere, a passage leading from the chamber to a control nipple mounted on said pulsator and adapted to be connected by flexible hose means to the space between teat cup shell and inflation, and solenoid means mounted in the body and supported in the passage to atmosphere for operatively moving the valve downward, the valve being then narrowly spaced from the upper seat adapting it to be pulled upward by vacuum when the vacuum nipple is connected to vacuum and the solenoid is deenergized, the pulsator having contact means mounted thereon for electrically connecting the solenoid between the vacuum line and stall cock contacts, whereby the inflation means is rythmically and successively subjected to atmospheric pressure, and then subatmospheric pressure.

2. The milking system defined in claim 1 wherein the pulsator valve seal means comprise rings of resilient material seated in substantially semi-annular grooves around the upper and lower edges of the valve, the grooves being located for securing the rings projecting from the valve surfaces.

3. The milking system defined in claim 1 wherein the pulsator passages from the valve chamber to the control nipple and to the vacuum nipple are substantially as large as the passage through the stall cock whereby pressure in the cow connecting means is rapidly lowered when the solenoid is operated.

* * * * *